US012763304B2

(12) United States Patent
Kovarik

(10) Patent No.: US 12,763,304 B2
(45) Date of Patent: Oct. 13, 2026

(54) SYSTEMS AND METHODS FOR FLASH BOILING OF A LIQUID SAMPLE

(71) Applicant: DH Technologies Development Pte. Ltd., Singapore (SG)

(72) Inventor: Peter Kovarik, Markham (CA)

(73) Assignee: DH Technologies Development Pte. Ltd., Singapore (SG)

( * ) Notice: Subject to any disclaimer, the term of this patent is extended or adjusted under 35 U.S.C. 154(b) by 299 days.

(21) Appl. No.: 18/689,467

(22) PCT Filed: Sep. 9, 2022

(86) PCT No.: PCT/IB2022/058512
§ 371 (c)(1),
(2) Date: Mar. 6, 2024

(87) PCT Pub. No.: WO2023/037307
PCT Pub. Date: Mar. 16, 2023

(65) Prior Publication Data

US 2024/0395527 A1 Nov. 28, 2024

Related U.S. Application Data

(60) Provisional application No. 63/242,127, filed on Sep. 9, 2021.

(51) Int. Cl.
*H01J 49/04* (2006.01)
*H01J 49/16* (2006.01)
*H01J 49/24* (2006.01)

(52) U.S. Cl.
CPC ............ *H01J 49/045* (2013.01); *H01J 49/16* (2013.01); *H01J 49/24* (2013.01)

(58) Field of Classification Search
CPC .......... H01J 49/00; H01J 49/02; H01J 49/045; H01J 49/16; H01J 49/24; H01J 49/0468; H01J 49/165
(Continued)

(56) References Cited

U.S. PATENT DOCUMENTS 5,223,226 A 6/1993 Wittmer et al.
6,501,073 B1 12/2002 Mylchreest et al.
(Continued)

FOREIGN PATENT DOCUMENTS

CN 104422727 A 3/2015
EP 1963024 9/2008
(Continued)

OTHER PUBLICATIONS

Hager et al., "Product ion scanning using a Q-q-Q linear ion trap (Q Trap) mass spectrometer", Rapid Communications in Mass Spectrometry, 2003; 17: 1056-1064.
(Continued)

*Primary Examiner* — Jason L Mccormack

(57) ABSTRACT

A method of ejecting a sample from a nebulizer nozzle fluidically coupled to a port via a transfer conduit includes receiving at the port a transport liquid and the sample. The transport liquid and the sample in the transfer conduit is transported from the port to a transfer conduit exit comprising an electrode tip. The transport liquid is ejected from the transfer conduit exit. The sample is ejected from the transfer conduit exit substantially simultaneously with ejecting the transport liquid. During ejection of the transport liquid and the sample from the transfer conduit exit, a pressure is generated at the transfer conduit exit substantially similar to a vapor pressure of the transport liquid.

20 Claims, 9 Drawing Sheets

(58) Field of Classification Search
USPC .......................................... 250/281, 282, 288
See application file for complete search history.

(56) References Cited

U.S. PATENT DOCUMENTS

| | | | | |
|---|---|---|---|---|
| 7,923,681 | B2 | 4/2011 | Collings et al. | |
| 10,770,277 | B2 | 9/2020 | Datwani et al. | |
| 2003/0201390 | A1 | 10/2003 | Corso et al. | |
| 2005/0145787 | A1 | 7/2005 | Prosser | |
| 2010/0243753 | A1 * | 9/2010 | Doak | B05B 7/0475 239/398 |
| 2013/0056631 | A1 | 3/2013 | Tomany et al. | |
| 2014/0145075 | A1 * | 5/2014 | Zhang | H01J 49/061 250/288 |
| 2019/0157060 | A1 | 5/2019 | Datwani et al. | |
| 2020/0264132 | A1 | 8/2020 | Furtaw et al. | |
| 2020/0357622 | A1 * | 11/2020 | Arnold | H01J 49/04 |
| 2024/0096614 | A1 | 3/2024 | Kovarik | |
| 2024/0331992 | A1 | 10/2024 | Kovarik | |

FOREIGN PATENT DOCUMENTS

| | | |
|---|---|---|
| JP | 2003-217503 A | 7/2003 |
| WO | 00/19193 | 4/2000 |
| WO | 2018/045208 | 3/2018 |
| WO | 2021/140713 | 7/2021 |

OTHER PUBLICATIONS

Semerjian, Hratch G., Ed., "ICLASS-91 NIST SP 813", NIST, National Institute of Standards and Technology, 96, Jul. 18, 1991, pp. 857-864.

PCT International Search Report and Written Opinion in International Application PCT/IB2022/058512, mailed Dec. 20, 2022, 19 pages.

PCT International Preliminary Report on Patentability in International Application PCT/IB2022/058512, mailed Mar. 21, 2024, 11 pages.

Maxwell, Jane et al., "Decoupling CE and ESI for a more robust interface with MS", Electrphoresis, Verlag Chemie, Hoboken, NJ, USA, vol. 31, No. 7, Mar. 1, 2010, pp. 1130-1137.

* cited by examiner

SYSTEMS AND METHODS FOR FLASH BOILING OF A LIQUID SAMPLE

CROSS-REFERENCE TO RELATED APPLICATION

This application is a National Stage Application of PCT/IB2022/058512, filed on Sep. 9, 2022, which claims the benefit of U.S. Provisional Application No. 63/242,127, filed on Sep. 9, 2021, the entire disclosures of which are incorporated herein by reference in their entireties. To the extent appropriate, a claim of priority is made to each of the above disclosed applications.

BACKGROUND

Mass spectrometry (MS) based methods can achieve label-free, universal mass detection of a wide range of analytes with exceptional sensitivity, selectivity, and specificity. As a result, there is significant interest in improving the throughput of MS-based analysis for many applications. A number of sample introduction systems for MS-based analysis have been improved to provide higher throughput. Acoustic droplet ejection (ADE) has been combined with an open port interface (OPI) to provide a sample introduction system for high-throughput mass spectrometry. The sample is ejected from electrospray ionization (ESI) source and analyzed by a MS.

SUMMARY

In one aspect, the technology relates to a method of ejecting a sample from a nebulizer nozzle fluidically coupled to a port via a transfer conduit, the method including: receiving at the port a transport liquid and the sample; transporting the transport liquid and the sample in the transfer conduit from the port to a transfer conduit exit including an electrode tip; ejecting the transport liquid from the transfer conduit exit; ejecting the sample from the transfer conduit exit substantially simultaneously with ejecting the transport liquid; and during ejection of the transport liquid and the sample from the transfer conduit exit, generating a pressure at the transfer conduit exit substantially similar to a vapor pressure of the transport liquid. In an example, the method further includes ejecting a nebulizer gas from a nebulizer nozzle substantially simultaneously with ejecting the transport liquid and the sample, wherein the transfer conduit exit projects from the nebulizer nozzle. In another example, the method further includes heating the nebulizer gas ejected from the nebulizer nozzle. In yet another example, heating the nebulizer gas includes heating the nebulizer nozzle. In still another example, heating the nebulizer gas includes applying a thermal energy to a reservoir containing the nebulizer gas.

In another example of the above aspect, the method further includes applying a thermal energy to the electrode tip. In an example, the method further includes heating the transport liquid. In another example, the electrode tip is disposed in a vacuum chamber and wherein the method further includes applying a vacuum pressure to the vacuum chamber, wherein the vacuum pressure is substantially similar to the vapor pressure of the transport liquid. In yet another example, the nebulizer gas includes nitrogen.

In another aspect, the technology relates to a mass analysis instrument including: a port for receiving a sample and a transport liquid; a transfer conduit coupled to the port and having a transfer conduit end opposite the port; an electrode tip coupled to the transfer conduit end; a processor; and a memory storing instructions that are configured to, when executed by the processor, cause the mass analysis instrument to perform a set of operations including: substantially simultaneously ejecting the sample and the transport fluid from the transfer conduit end; and performing a pressure-generating operation proximate the transfer conduit end, wherein the pressure-generating operation generates a pressure at the transfer conduit end substantially similar to a vapor pressure of the transport liquid. In an example, the mass analysis instrument further includes a vacuum chamber, wherein the transfer conduit end is disposed within the vacuum chamber, wherein the pressure-generating operation includes applying a vacuum to the vacuum chamber, wherein the vacuum includes a pressure substantially similar to the vapor pressure. In another example, the mass analysis instrument further includes a nebulizer nozzle, wherein the electrode tip projects from the nebulizer nozzle, and wherein the pressure-generating operation includes applying a thermal energy to at least one of the nebulizer nozzle and the transfer conduit, wherein the thermal energy applied elevates a temperature of the transport liquid to a flash boiling temperature as the transport liquid and the sample are ejected from the transfer conduit end. In yet another example, the mass analysis instrument further includes a nebulizer nozzle, wherein the electrode tip projects from the nebulizer nozzle, and wherein the set of operations further includes ejecting a nebulizer gas from the nebulizer nozzle substantially simultaneously with ejecting the transport liquid and the sample, and wherein the pressure-generating operation includes applying a thermal energy to the nebulizer gas to elevate a temperature of the transport liquid to a flash boiling temperature as the transport liquid, the sample, and the nebulizer gas are ejected. In still another example, the mass analysis instrument further includes a vacuum chamber, wherein the nebulizer nozzle is disposed in the vacuum chamber.

In another example of the above aspect, the port is fluidically coupled to a liquid chromatography (LC) column. In an example, the port includes an open port interface (OPI). In another example, the mass analysis instrument further includes a nebulizer nozzle including a diameter of greater than about 0.3 mm. In yet another example, the electrode tip projects a distance of about at least about 0.3 mm from a terminal end of the nebulizer nozzle. In still another example, the transport liquid includes at least one of methanol and acetonitrile.

In another aspect, the technology relates to a mass analysis instrument including: a port for receiving a sample and a transport liquid; and a transfer conduit communicatively coupled at a first end to the port and at a second end to a reduced pressure region, wherein the reduced pressure region includes a pressure substantially similar to a vapor pressure of the transport liquid. In an example, the mass analysis instrument further includes a heater disposed adjacent at least one of the transfer conduit and the reduced pressure region. In another example, the mass analysis instrument further includes a nebulizer nozzle communicatively coupled to the second end of the transfer conduit and the reduced pressure region. In yet another example, the transport liquid vapor pressure is about 30% or more, about 40% or more, about 50% or more, or about 60% or more of a pressure of the reduced pressure region.

DETAILED DESCRIPTION

Figure 1:
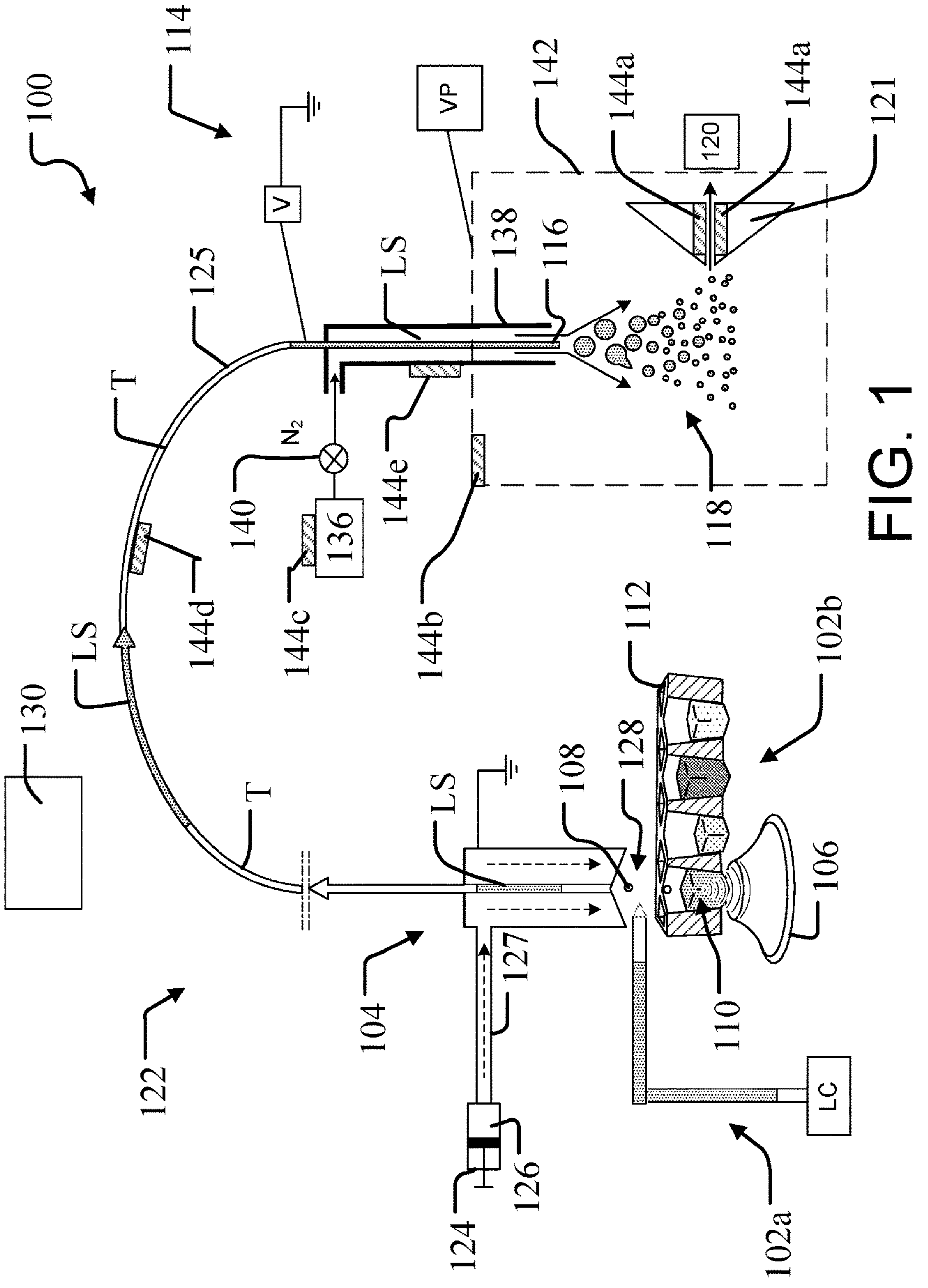
FIG. 1 is a schematic view of an example system combining acoustic droplet ejection (ADE) with an open port interface (OPI) sampling interface and electrospray ionization (ESI) source.

FIG. 1 is a schematic view of an example system 100 combining a sample introduction system 102*a*, 102*b* with an OPI sampling interface 104 and ESI source 114. The system 100 may be a mass analysis instrument such as a mass spectrometry device that is for ionizing and mass analyzing analytes received within an open end of a sampling OPI. Such a system 100 is described, for example, in U.S. Pat. No. 10,770,277, the disclosure of which is incorporated by reference herein in its entirety. In one example, the sample introduction system 102*a* may be a liquid chromatography (LC) column that may introduce samples directly to the OPI sampling interface 104. Alternatively, an LC column may introduce samples directly to the mass analyzer via transfer conduit 125.

In another example, the sample introduction system 102*b* is an ADE that includes an acoustic ejector 106 that is configured to eject a droplet 108 from a reservoir 110 of a well plate 112 into the open end of sampling OPI 104. The mass analysis system 100 that includes the ADE 102*b* is described in more detail herein for clarity, but the various components depicted may be utilized generally with either sample introduction system 102*a*, 102*b*, as would be apparent to a person of skill in the art. As shown in FIG. 1, the example system 100 generally includes the sampling OPI 104 in liquid communication with the ESI source 114 for discharging a liquid containing one or more sample analytes (e.g., via electrospray electrode 116) into an ionization chamber 118, and a mass analyzer detector (depicted generally at 120) in communication with the ionization chamber 118 for downstream processing and/or detection of ions generated by the ESI source 114. Due to the configuration of the nebulizer nozzle 138 and electrospray electrode 116 of the ESI source 114, samples ejected therefrom are transformed into the gas phase for analysis. A liquid handling system 122 (e.g., including one or more pumps 124 and one or more transfer conduits 125) provides for the flow of liquid from a transport liquid reservoir 126 to the sampling OPI 104 and from the sampling OPI 104 to the ESI source 114. The transport liquid reservoir 126 (e.g., containing a liquid, desorption solvent such as methanol or acetonitrile) can be liquidly coupled to the sampling OPI 104 via a supply conduit 127 through which the transport liquid can be delivered at a selected volumetric rate by the pump 124 (e.g., a reciprocating pump, a positive displacement pump such as a rotary, gear, plunger, piston, peristaltic, diaphragm pump, or other pump such as a gravity, impulse, pneumatic, electrokinetic, and centrifugal pump), all by way of non-limiting example. As discussed in detail below, the flow of liquid into and out of the sampling OPI 104 occurs within a sample space accessible at the open end such that one or more droplets 108 can be introduced into the liquid boundary 128 at the sample tip and subsequently delivered to the ESI source 114.

An acoustic ejector 106 is configured to generate acoustic energy that is applied to a liquid contained within a reservoir 110 that causes one or more droplets 108 to be ejected from the reservoir 110 into the open end of the sampling OPI 104. A controller 130 can be operatively coupled to and configured to operate any aspect of the system 100. This enables the ADE 102*b* to inject droplets 108 into the sampling OPI 104 as otherwise discussed herein substantially continuously or for selected portions of an experimental protocol by way of non-limiting example. Controller 130 can be, but is not limited to, a microcontroller, a computer, a microprocessor, or any device capable of sending and receiving control signals and data. Wired or wireless connections between the controller 130 and the remaining elements of the system 100 are not depicted but would be apparent to a person of skill in the art.

As shown in FIG. 1, the ESI source 114 can include a source 136 of pressurized gas (e.g. nitrogen, air, or a noble gas) that supplies a high velocity nebulizing gas flow to the nebulizer nozzle 138 that surrounds the outlet tip of the electrospray electrode 116. As depicted, the electrospray electrode 116 protrudes from a distal end of the nebulizer nozzle 138. The pressurized gas interacts with the liquid discharged from the electrospray electrode 116 to enhance the formation of the sample plume and the ion release within the plume for sampling by mass analyzer detector 120, e.g., via the interaction of the high speed nebulizing flow and jet of liquid sample (e.g., analyte-solvent dilution). The liquid discharged may include liquid samples LS received from each reservoir 110 of the well plate 112. The liquid samples LS are diluted with the transport liquid T and typically separated from other samples by volumes of the transport liquid T. The nebulizer gas can be supplied at a variety of flow rates, for example, in a range from about 0.1 L/min to about 30 L/min, which can also be controlled under the influence of controller 130 (e.g., via opening and/or closing valve 140).

It will be appreciated that the flow rate of the nebulizer gas can be adjusted (e.g., under the influence of controller 130) such that the flow rate of liquid and flow type within the sampling OPI 104 can be adjusted based, for example, on suction/aspiration force generated by the interaction of the nebulizer gas and the analyte-solvent dilution as it is being discharged from the electrospray electrode 116 (e.g., due to the Venturi effect/gas expansion shock structure). The ionization chamber 118 may be maintained at atmospheric pressure, though in examples consistent with the disclosure herein, the ionization chamber 118 may operate at a pressure lower than atmospheric pressure. In other examples, the ionization chamber 118 may be a vacuum chamber 142, the reduced pressure environment of which may be further adjusted as described herein, e.g., via a vacuum pump VP.

In an alternative example relevant to the disclosure herein, nebulizer gas need not be utilized to assist in ionization of the liquid samples LS. In such a configuration, the closing valve 140 may be in a closed position during the ionization process. In another example, the nebulizer nozzle 138 and nebulizer gas source 136 may be completely eliminated. Instead, the liquid samples LS and transport liquid T may be ejected into the reduced pressure environment of the ionization chamber 118/vacuum chamber 142, e.g., from the electrospray electrode 116 disposed at an end or exit of the transfer conduit 125, where if conditions are properly set, ionization may nevertheless occur without the use of nebulizer gas.

Further relevant to examples of the present disclosure, a number of heaters 144 are also depicted; one or more of these heaters 144 may be utilized to adjust the thermal energy applied, directly or indirectly, to the transport liquid T, as described below. One or more differential mobility spectrometer (DMS) cell heaters 144*a* are often included within a DMS cell 121 upstream of the mass analysis detector 120 and may be used to apply thermal energy to the ionization chamber 118. In another example, an ionization chamber heater 144*b* may apply thermal energy directly to the chamber 118 itself. A nozzle heater 144*e* is also depicted and may be used to heat each of the liquid sample LS, transport liquid T, and nebulizer gas (if present) as they are discharged from the nebulizer nozzle 138. In other examples, the nozzle heater 144*e* may transfer thermal energy to the electrode 116 itself. Discrete heating of the nebulizer gas may be performed by a source heater 144*c*. In another example, heating of the liquid sample LS and transport liquid T may be performed by a transfer conduit heater 144*d*. The configurations of the various heaters 144 may be as required or desired for each application. For example, cell heaters 144*a* are known in the art. Ionization chamber heaters 144*b* and/or source heaters 144*c* may be electric, ultrasonic, conductive, radiative, or other heaters in direct contact with a transmissive structure of the chamber 118 or source reservoir 136, respectively. Transfer conduit heater 144*d* may be an electric coil wrapped about the transfer conduit 125, or may be of another configuration as required. Control of the heaters 144 may be via the controller 130, in response to signal sent from various temperature sensors (not depicted) disposed throughout the system 100.

It will also be appreciated by a person skilled in the art and in light of the teachings herein that the mass analyzer detector 120 can have a variety of configurations. Generally, the mass analyzer detector 120 is configured to process (e.g., filter, sort, dissociate, detect, etc.) sample ions generated by the ESI source 114. By way of non-limiting example, the mass analyzer detector 120 can be a triple quadrupole mass spectrometer, or any other mass analyzer known in the art and modified in accordance with the teachings herein. Other non-limiting, exemplary mass spectrometer systems that can be modified in accordance with various aspects of the systems, devices, and methods disclosed herein can be found, for example, in an article entitled "Product ion scanning using a Q-q-Q linear ion trap (Q TRAP) mass spectrometer," authored by James W. Hager and J. C. Yves Le Blanc and published in Rapid Communications in Mass Spectrometry (2003; 17:1056-1064); and U.S. Pat. No. 7,923,681, entitled "Collision Cell for Mass Spectrometer," the disclosures of which are hereby incorporated by reference herein in their entireties.

Other configurations, including but not limited to those described herein and others known to those skilled in the art, can also be utilized in conjunction with the systems, devices, and methods disclosed herein. For instance, other suitable mass spectrometers include single quadrupole, triple quadrupole, ToF, trap, and hybrid analyzers. It will further be appreciated that any number of additional elements can be included in the system 100 including, for example, an ion mobility spectrometer (e.g., a DMS 121, as depicted) that is disposed between the ionization chamber 118 and the mass analyzer detector 120 and is configured to separate ions based on their mobility difference between in high-field and low-field. Additionally, it will be appreciated that the mass analyzer detector 120 can comprise a detector that can detect the ions that pass through the analyzer detector 120 and can, for example, supply a signal indicative of the number of ions per second that are detected.

Figure 2:
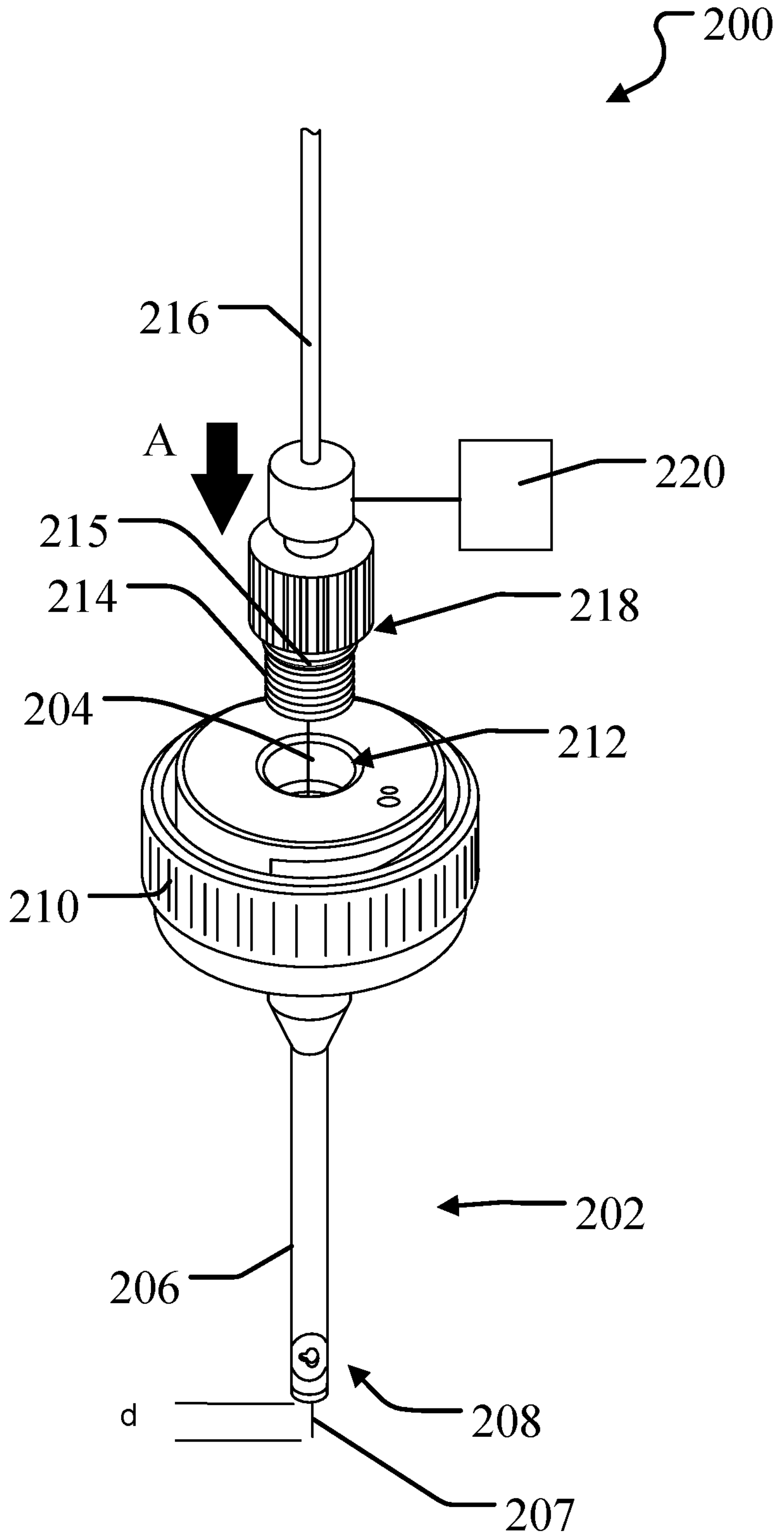
FIG. 2 a partial perspective view of an ESI source.

FIG. 2 is a partial perspective view of an ESI source 200, namely a nebulizer nozzle 202 and an inner electrospray electrode 204. The nebulizer nozzle 202 includes an outer conduit 206 including a distal end 208 from which liquid may be discharged into an ionization chamber, such as described above. A housing 210 may be utilized to secure the nebulizer nozzle 202 within a mass spectrometry device. The housing 210 defines a central channel 212 through which the electrospray electrode 204 passes. The electrospray electrode 204 may be connected to a threaded base 214 that may be received in a mating threaded portion of the central channel 212. Within the threaded base 214, the electrospray electrode 204 may be fluidically coupled to a conduit end 216 of a liquid handling system (e.g., the transfer conduit 125 described above) of the mass spectrometry device. A ferrule 218 may surround a portion of the electrode 204 and threaded base 214 may be rotated so as to advance A a tip 207 of the electrospray electrode 204 within the outer conduit 206 of the nebulizer nozzle 202, towards or through the distal end 208. In examples, the tip 207 may project a distance d beyond the distal end 208. A compressible O-ring or gasket 215 may be disposed between a portion of the threaded base 214 (or the ferrule 218) and housing 210 so as to maintain the gas seal regardless of depth of threaded base 214 within the central channel 212. Rotation of the ferrule 218 or the threaded base 214 in an opposite direction may retract the tip of the electrospray electrode 204 away from the distal end 208. In another example, a motor 220 may be used to advance or retract the electrospray electrode 204, in addition to or instead of the manually-rotated ferrule 218 or the threaded base 214. The position of the electrospray electrode 204 relative to the nebulizer nozzle 202 (e.g., a position disposed therein or protruding therefrom) is directly related to the strength of the Venturi aspiration force (e.g., the pressure drop at the electrode tip) determining the analytical sensitivity and reproducibility, throughput, and matrix tolerance. In addition, the projection distance d directly impacts the data reproducibly. In examples, the transfer conduit end 216 may terminate at the electrode 207 which projects beyond the distal end of the nebulizer nozzle 202.

Known nebulizer nozzles are designed and optimized for interaction between the transport liquid/liquid sample dilution and the nebulizer gas. As these fluids are ejected from the nebulizer nozzle, the liquid component is broken up into fine droplets that then desolvated during flight to the mass analysis device. The technologies described herein may be used to discharge the transport liquid under such conditions as to cause flash boiling thereof, thus improving ionization, increasing the pressure drop at the transfer conduit end, etc. In examples, the technology may be used to discharge the transport liquid and liquid sample directly from the transfer conduit exit/electrode tip and into an ionization chamber under vacuum. In other examples, the technology includes use of a specialized nebulizer nozzle, referred to herein as a "flash boiling" probe or nozzle. The flash boiling nozzle uses the pressure reduction at the nozzle exit to induce near instantaneous vaporization of the liquid sample due to a match between transport liquid vapor pressure and the pressure reduction at the nozzle probe tip. This improvement makes possible mass analysis system operation at higher sample transfer flow rates needed for high throughput applications. The flash boiling probe may be designed to match the transport liquid vapor pressure with the pressure drop at the nebulizer tip controlling the design of and balancing the nebulizer nozzle size with the distance the electrode protrudes from the nozzle. Further, materials and surface treatments used for the nozzle and/or the electrode tip may be selected accordingly to reduce erosion of the nebulizer nozzle and/or electrode tip, which may increase due to the flash boiling effect. Other factors that may affect flash boiling of the transport liquid include nebulizer gas flow (drive pressure), temperature of the liquid sample and/or transport liquid, temperature of the nebulizer gas, temperature of the nebulizer nozzle and/or probe, temperature and/or pressure of the ionization chamber, etc. Certain of these factors are described in more detail below.

The flash boiling probe described herein offers an alternate manner of generating ions from a liquid sample; flash vaporization is a fast process of turning liquid into a gas phase that may aid in the ionization process. The efficiency of ion generation offers a potential for complete elimination of nebulizer gas flow, which would simplify the ion source and eliminate sample dilution due to the presence of the nebulizer gas. The increased efficiency further improves high throughput sample delivery that is attendant with OPI transport flow. In examples, a flash boiling probe having a nebulizer nozzle diameter, nebulizer gas flow, and an electrode protrusion distance may be optimized for a Venturi/gas expansion shock pressure drop so as to match the vapor pressure of the transport liquid. As the liquid (a dilution of the liquid sample and the transport liquid) leaves the electrode, it is instantaneously vaporized. In examples, a mass analysis system utilizing such a flash boiling probe may also use temperature control of the transport liquid (and/or nebulizer gas) or of the expansion region as to raise its vapor pressure to match the pressure drop. The "expansion region" may include the ionization chamber or volume surrounding the nebulizer nozzle, or components of the nebulizer nozzle itself. An optimized process would determine to what extend the transport liquid is flash vaporized versus conventionally desolvated via heaters located within the analysis instrument. Even a condition of incomplete vaporization would likely provide performance advantages. As such, the term "optimization," as used herein to describe conditions that lead to complete transport liquid vaporization, also contemplates partial vaporization, which may nevertheless lead to performance improvements for a mass analysis system utilizing such a flash boiling technology. Exact matching of the transport liquid vapor pressure and the ionization chamber pressure need not be achieved to notably improve system performance; indeed, substantial similarity in those pressures may be sufficient. In other examples, desirable performance may be obtained when the transport liquid vapor pressure is about 30% or more, about 40% or more, about 50% or more, or about 60% or more of the ionization chamber pressure.

Design of a nebulizer nozzle that can achieve a flash boiling condition contemplates, for an available nebulizer gas supply (e.g., a gas flowrate that is delivered at a drive pressure), a probe nozzle diameter and electrode protrusion distance selected to give a desired pressure drop at the electrode tip. Table 1, below, provides example values that characterize nebulizer flows, vacuums achieved, and nozzle diameters that may be used to design a flash boiling probe for a given transport liquid. In addition to Table 1 below, FIGS. 3-7B depict other factors that may be considered in system design to achieve the desired pressure drop at the transfer conduit end/electrode tip to attain a flash boiling or substantial flash boiling effect.

TABLE 1

Example nebulizer nozzle characteristics

| nebulizer nozzle diameter (Ø) mm | electrode protrusion (mm) | nebulizer gas flow (L/min) | vacuum drop from atmosphere at electrode tip (psi) |
|---|---|---|---|
| 0.625 | 0.50 | 16.2 | 7.5 |
| 0.625 | 0.25 | 11.5 | 5 |
| 0.500 | 0.40 | 10.5 | 5 |
| 0.400 | 0.30 | 2.5 | 3 |

Figure 3:
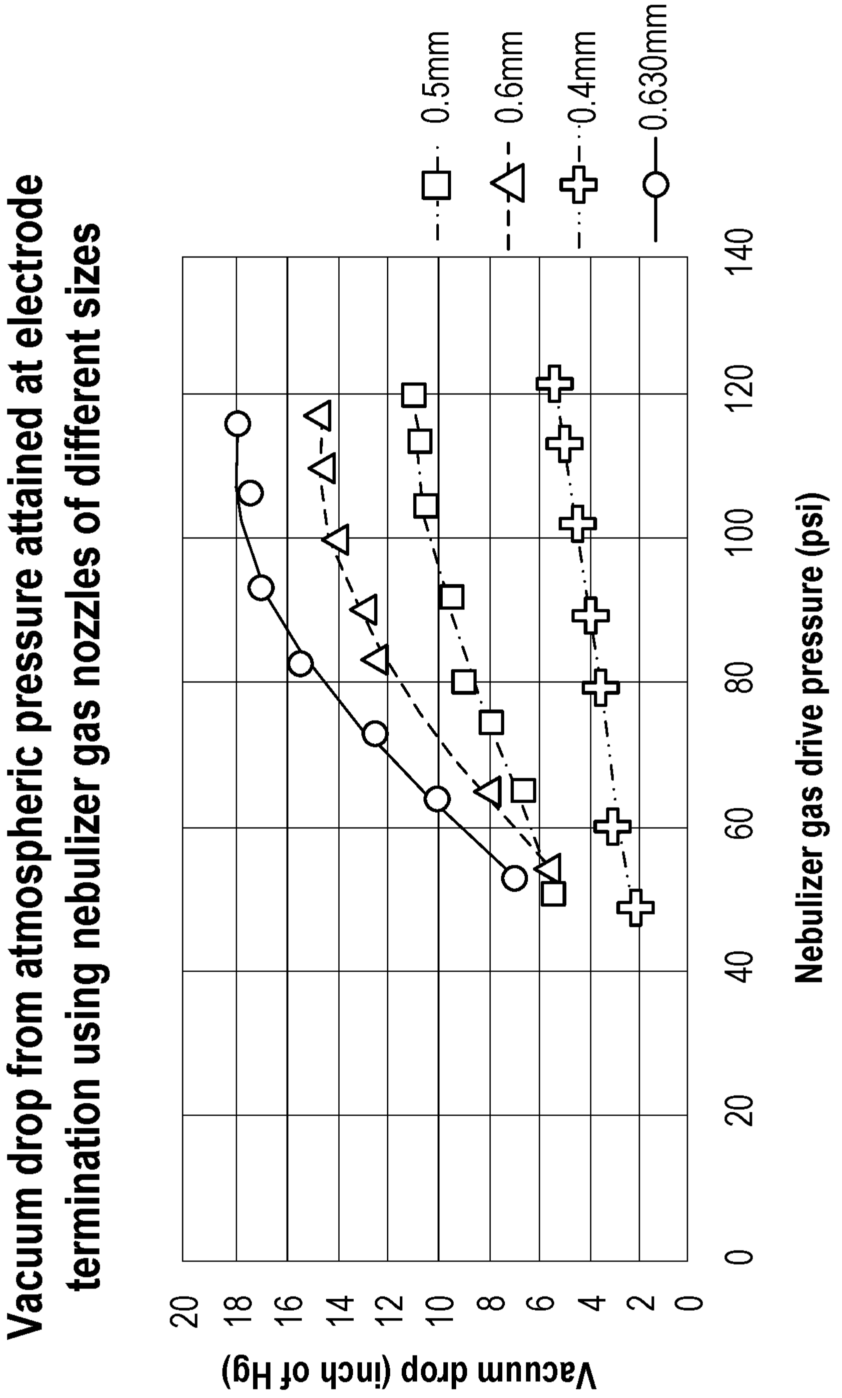
FIG. 3 depicts a vacuum variation at the end of a transfer conduit with the nebulizer drive pressure for a range of nozzle diameters.

FIG. 3 depicts a vacuum drop from atmosphere variation at the end of the transfer conduit mapped with the nebulizer drive pressure for the different sizes of nozzles. If a given pressure of the nebulizer drive gas is maintained, vacuum drop improves with the increase of the nozzle diameter, as depicted. As the nozzle diameter Ø increases from 0.4 to 0.6 mm, the vacuum drop improves by about 2.5 times, providing a substantially proportional improvement in throughput. Although efficiency of the vacuum generation reduces (e.g., the slope flattens) for the larger nozzles near the top end of the nebulizer gas drive pressure range. This flattening of the slope is indicative of the larger nozzles reaching a vacuum drop limit in that region.

Figure 4:
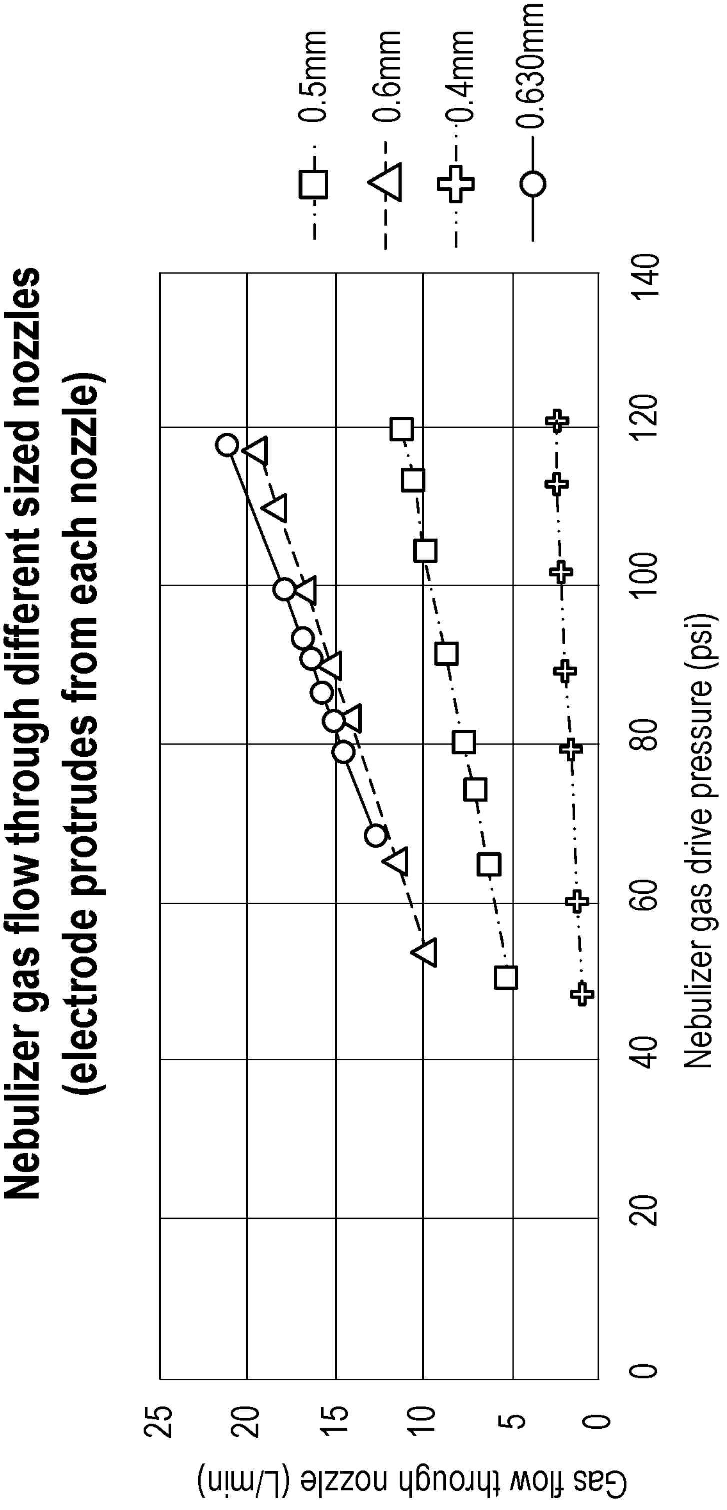
FIG. 4 depicts a plot of gas flow dependence on drive pressure for a range of nozzle diameters.

As the nebulizer nozzle diameter gets larger, so does the gas flow therethrough. FIG. 4 depicts a plot of gas flow dependence on drive pressure for a range of nozzle diameters (Ø=0.4, 0.5, 0.6, and 0.63 mm). As can be seen, the relationship over the range depicted is linear, indicating a sonic expansion regime. The slope increases with the size of the nozzle. Thus, in order to maintain the pressure drop for the nebulizer drive gas across a larger diameter nozzle, significantly more gas flow is needed. The plot allows comparison of nebulizer gas flows for different sized nozzles, as an example, at 100 psi nebulizer gas pressure.

Figure 5:
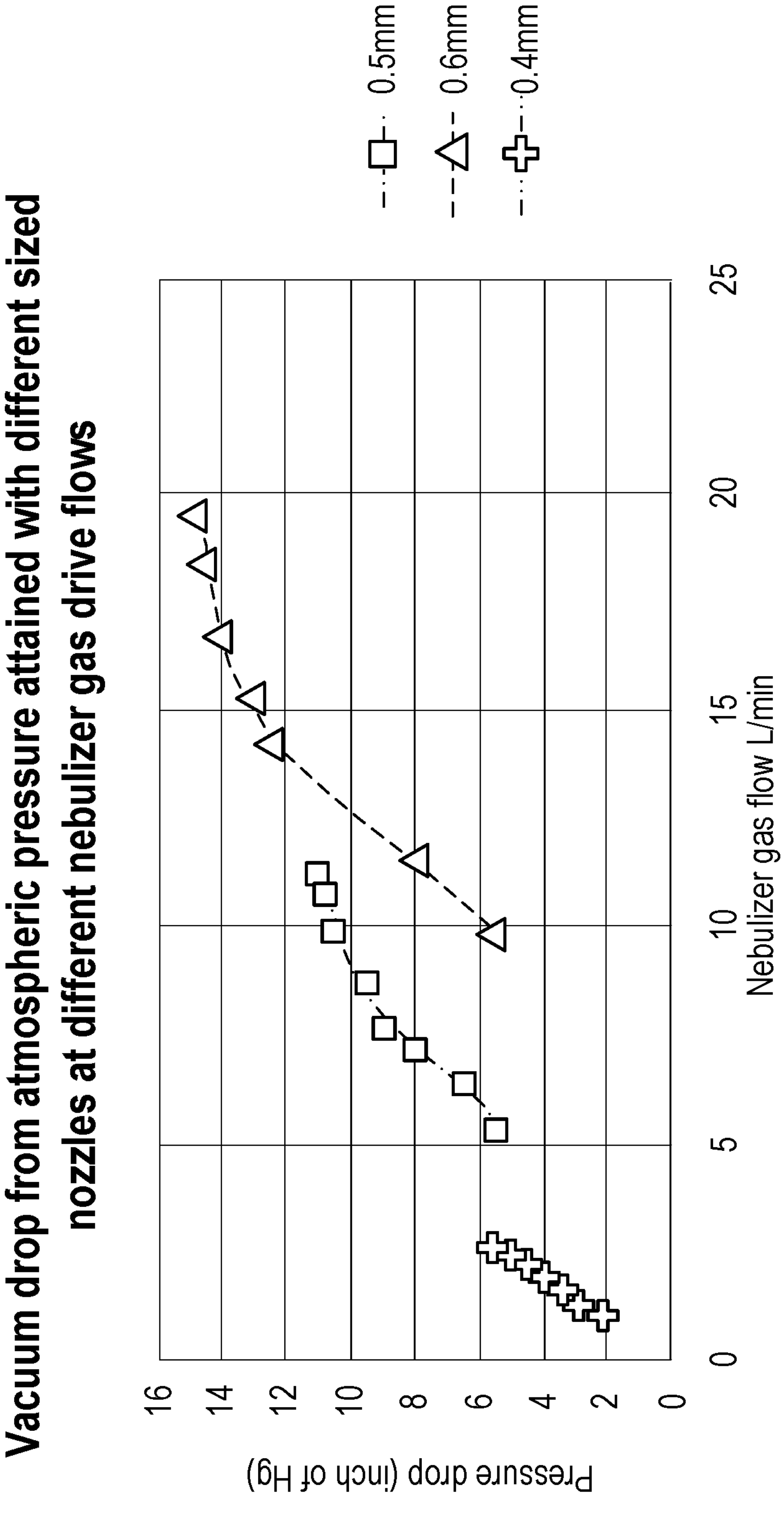
FIG. 5 depicts a relationship between nebulizer gas consumption required to achieve a given level of vacuum at a transfer conduit terminus.

FIG. 5 depicts a different visualization of the relationship between nebulizer gas consumption required to achieve a given level of vacuum at the transfer conduit end/electrode tip; it depicts the relationship between vacuum pressure drop from atmosphere and nebulizer gas flow. For example, if a pressure drop of about 6" of Hg (about 3 psi) is considered, FIG. 5 indicates that significantly less drive gas flow is needed with the nozzle Ø 0.4 mm, e.g., about four times less for nozzle Ø 0.4 mm versus 0.6 mm.

Figure 6:
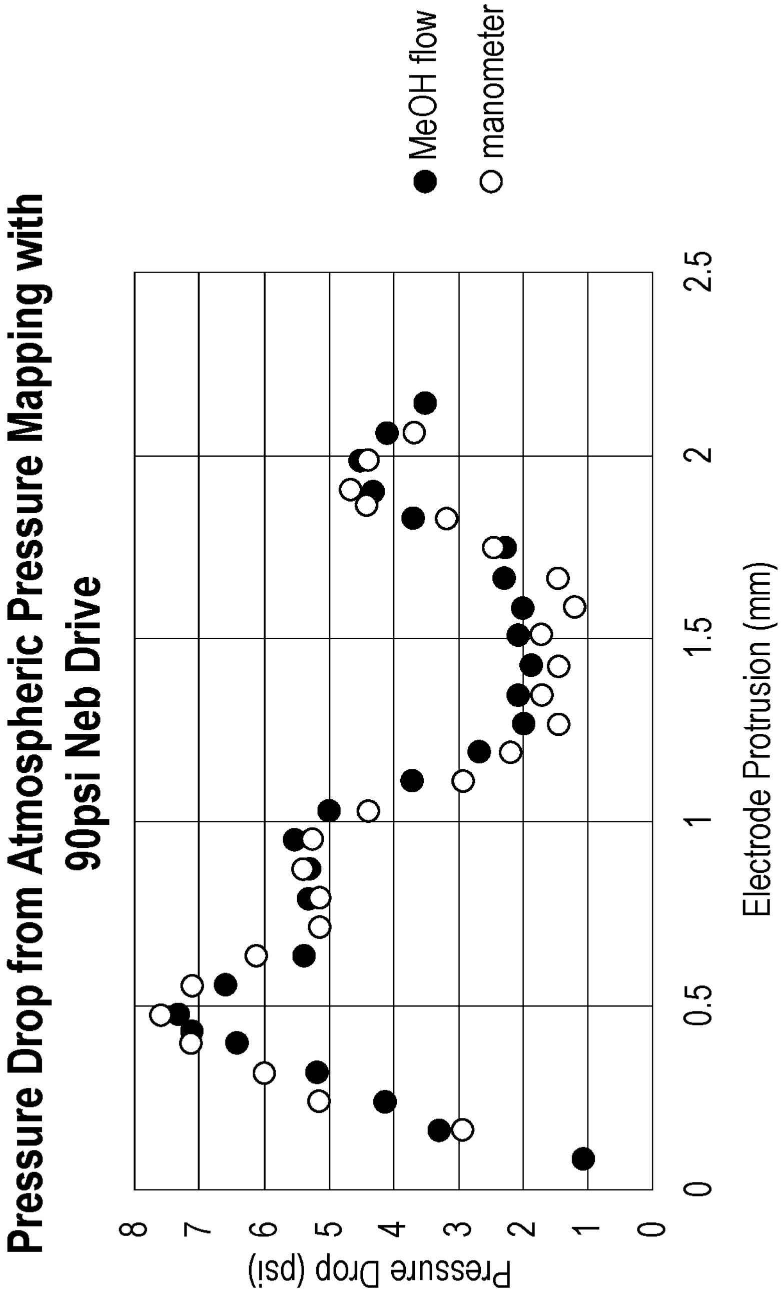
FIG. 6 depicts the impact of electrode protrusion on achieved vacuum for an example nozzle diameter of 0.63 mm.

FIG. 6 depicts the impact of electrode protrusion on achieved vacuum for an example nozzle diameter (Ø) of 0.63 mm. The location of maximum vacuum approximately follows:

$$x = 0.67\varnothing\sqrt{\text{drive Pressure/ambient Pressure}}, \quad \text{(Equation 1)}$$

where Ø needs to be corrected for the presence of the electrode within the nozzle.

Figure 7B:
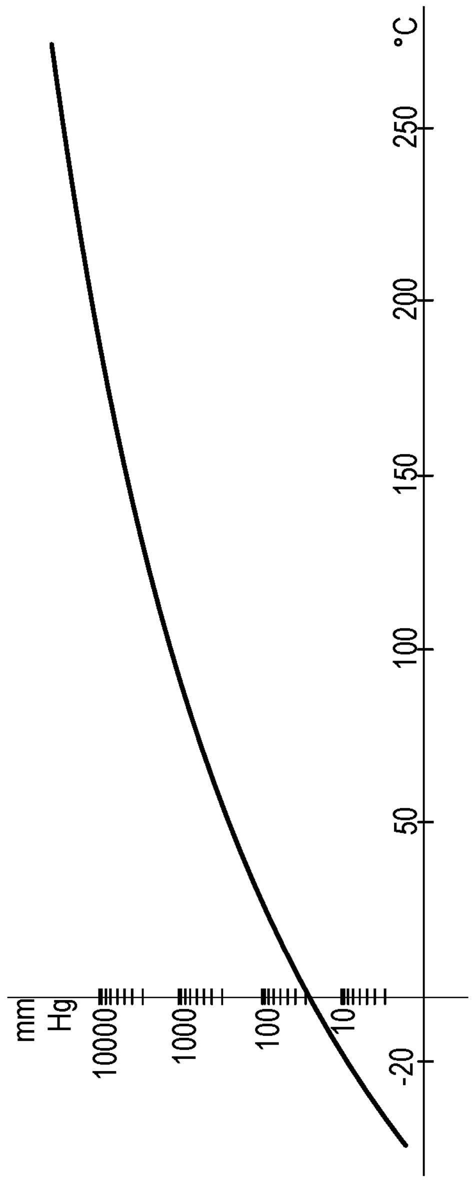
FIGS. 7A and 7B depict vapor pressure plots of methanol and acetonitrile, respectively.
Figure 7A:
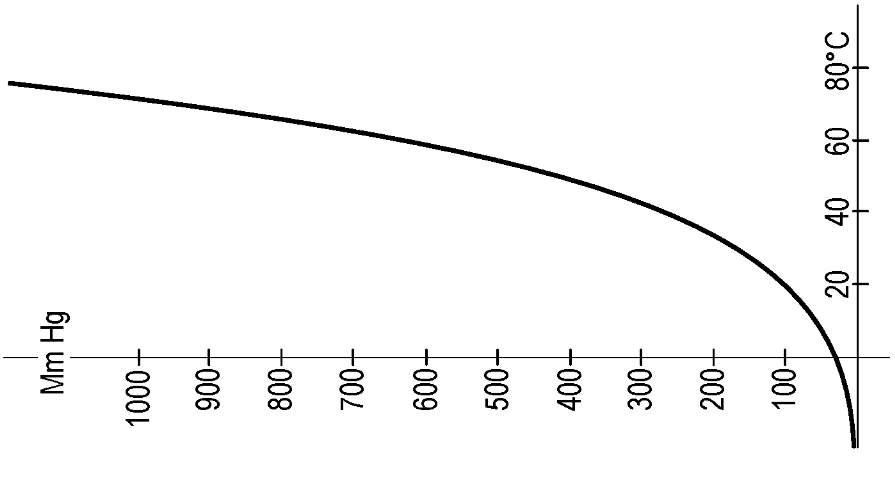

FIGS. 7A and 7B depict vapor pressure plots of methanol and acetonitrile, respectively. With these vapor pressure targets in mind, the above FIGS. 2-6 may be used to design system (or a probe to be used in such a system in terms of its critical parameters, e.g., nozzle diameter, electrode protrusion distance, and nebulizer gas flow (drive pressure and/or flowrate) to match the heating provided such that flash boiling conditions is achieved. The above characterization of the various operational conditions allow trade-offs between the parameters to suit the design and its constraints as well as control of the probe for given applications.

Figure 8:
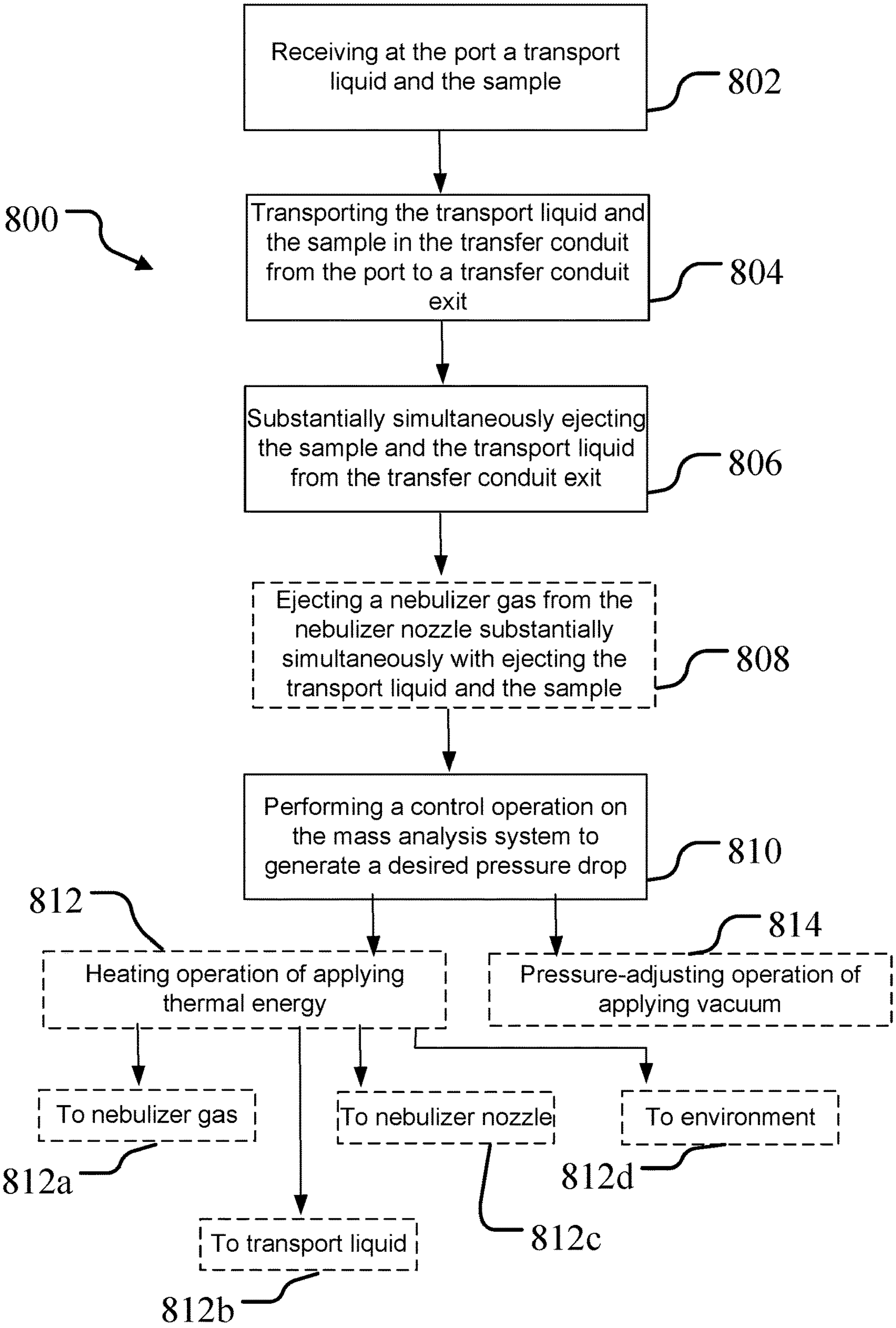
FIG. 8 depicts a method of ejecting a liquid sample from a nebulizer nozzle in a mass analysis system.

FIG. 8 depicts a method 800 of ejecting a fluid in a mass analysis system so as to approach a flash boiling condition. The mass analysis system may be configured, for example, as the example system depicted in FIG. 1, and may include an OPI, a transfer conduit, a reduced pressure region at least partially containing the ESI source/probe, and mass analyzer. In examples, a nebulizer nozzle, a nebulizer gas source may also be included, but is not required. In still further examples, the nebulizer nozzle and electrode tip may be disposed in a vacuum chamber. The OPI may be communicatively coupled to a liquid sample source such as a well plate (with samples being delivered via an ADE, contactless ejector, or other type of ejector); or a liquid sample source such as an LC column. The nebulizer nozzle may be further configured as described herein to achieve a flash boiling condition of the transport liquid at ejection therefrom.

The method begins with operation 802, receiving at the port a transport liquid and a liquid sample. In operation 804, the transport liquid and the liquid sample are transported as a dilution in the transfer conduit from the port to a transfer conduit exit. The exit may discharge directly into a reduced pressure (relative to the port pressure) region. If utilized, the nebulizer nozzle is disposed in the reduced pressure region. The method 800 continues to operation 806, where the transport liquid and the liquid sample are ejected substantially simultaneously from the transfer conduit end. A pressure drop at the conduit exit may be substantially similar to a vapor pressure of the transport liquid, thereby causing flash boiling of the transport liquid and ionization of the liquid sample. As used herein, the term “substantially simultaneously” is intended to capture scenarios where the liquid sample and transport liquid is ejected at the same instantaneous moment, but also encompasses small variations in timing such that the flash boiling of the transport liquid at a given moment still causes ionizing of the liquid sample being ejected either slightly before or after the transport liquid. In a similar fashion, the phrase “substantially similar” is intended to capture slight variations between vapor pressure and of pressure drop/pressure/vacuum pressure/etc, wherein “flash boiling” of the transport liquid and ionization of the liquid sample occurs.

In alternative systems that utilize a nebulizer gas source and nebulizer nozzle, operation 808 includes ejecting a nebulizer gas from the nebulizer nozzle substantially simultaneously with ejecting the transport liquid and the liquid sample. Expansion of the nebulizer gas from the nozzle generates a pressure drop at the transport/transfer conduit exit. Further, the systems described herein include further components that may be utilized to perform one or more control operations on the mass analysis system, wherein the control operation assists in generating the desired pressure drop at the conduit end, operation 810. If a flash boiling condition has not already occurred due to the pressure of the ionization chamber and/or the configuration of the nebulizer nozzle (if present) and electrode tip, these control conditions may be utilized to obtain a pressure drop at the transfer conduit exit substantially similar to the vapor pressure of the transport liquid, thus causing flash boiling thereof.

The control operation referenced in operation 810 may include at least one of a heating operation that applies a thermal energy, operation 812, or a pressure-adjusting operation that applies a vacuum, operation 814. In other examples, expansion of the nebulizer gas, if present, acts as the pressure-adjusting operation. With regard to operation 814, the vacuum may be applied to the reduced pressure region (or vacuum chamber) in which the nebulizer nozzle is disposed. With regard to operation 812, thermal energy may be applied to one or more components or fluids during ejection from the nebulizer nozzle of the transport liquid and liquid sample, as well as the nebulizer gas, if present. In operation 812*a*, thermal energy is applied to the nebulizer gas to elevate a temperature of the transport liquid to a flash boiling temperature during ejection of the transport liquid, the sample, and the nebulizer gas. In operation 812*b*, the thermal energy is applied to the transport liquid itself, so as to elevate the temperature thereof to a flash boiling temperature. With regard to both operations 812*a* and 812*b*, FIG. 1 depicts locations of heaters that are used to heat, discretely, the nebulizer gas or the transport liquid. In another example, all fluids ejected from the nebulizer nozzle may be heated by applying a thermal energy to the nebulizer nozzle, operation 812*c* (and/or the electrode tip that forms a portion thereof). In another example, a heater located within the mass analysis device, or a discrete heater for the reduced pressure environment, may be used to heat the region into which the fluids are discharged, thereby elevating the temperature of that environment itself, operation 812*d*. These various heating options are not mutually exclusive.

Figure 9:
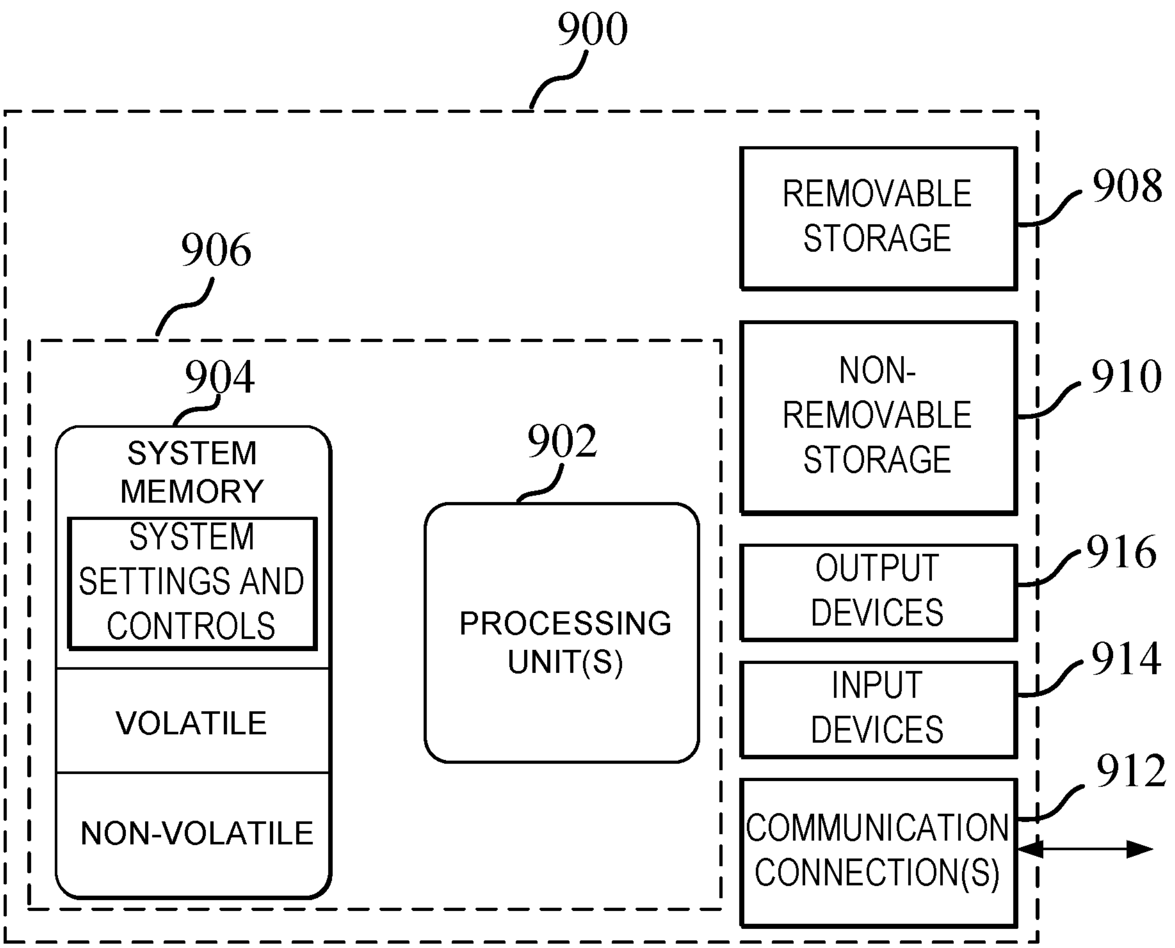
FIG. 9 depicts an example of a suitable operating environment in which one or more of the present examples can be implemented.

FIG. 9 depicts one example of a suitable operating environment 900 in which one or more of the present examples can be implemented. This operating environment may be incorporated directly into the controller for a mass spectrometry system, e.g., such as the controller depicted in FIG. 1. This is only one example of a suitable operating environment and is not intended to suggest any limitation as to the scope of use or functionality. Other well-known computing systems, environments, and/or configurations that can be suitable for use include, but are not limited to, personal computers, server computers, hand-held or laptop devices, multiprocessor systems, microprocessor-based systems, programmable consumer electronics such as smart phones, network PCs, minicomputers, mainframe computers, tablets, distributed computing environments that include any of the above systems or devices, and the like. In view of the portability of the processing systems described herein, a laptop or tablet computer may be desirably connected via a wired or wireless connection to a controller such as depicted in FIG. 1, and may send the appropriate control signals before, during, and after an electrode position-setting event, so as to control operation of the various components of the system.

In its most basic configuration, operating environment 900 typically includes at least one processing unit 902 and memory 904. Depending on the exact configuration and type of computing device, memory 904 (storing, among other things, instructions to control the transport liquid pump, heaters, vacuum source, gas source, etc., or perform other methods disclosed herein) can be volatile (such as RAM), non-volatile (such as ROM, flash memory, etc.), or some combination of the two. This most basic configuration is illustrated in FIG. 9 by dashed line 906. Further, environment 900 can also include storage devices (removable, 908, and/or non-removable, 910) including, but not limited to, magnetic or optical disks or tape. Similarly, environment 900 can also have input device(s) 914 such as touch screens, keyboard, mouse, pen, voice input, etc., and/or output device(s) 916 such as a display, speakers, printer, etc. Also included in the environment can be one or more communication connections 912, such as LAN, WAN, point to point, Bluetooth, RF, etc.

Operating environment 900 typically includes at least some form of computer readable media. Computer readable media can be any available media that can be accessed by processing unit 902 or other devices having the operating environment. By way of example, and not limitation, computer readable media can include computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, solid state storage, or any other tangible medium which can be used to store the desired information. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. A computer-readable device is a hardware device incorporating computer storage media.

The operating environment 900 can be a single computer operating in a networked environment using logical connections to one or more remote computers. The remote computer can be a personal computer, a server, a router, a network PC, a peer device or other common network node, and typically includes many or all of the elements described above as well as others not so mentioned. The logical connections can include any method supported by available communications media. Such networking environments are commonplace in offices, enterprise-wide computer networks, intranets and the Internet.

In some examples, the components described herein include such modules or instructions executable by computer system 900 that can be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some examples, computer system 900 is part of a network that stores data in remote storage media for use by the computer system 900.

This disclosure described some examples of the present technology with reference to the accompanying drawings, in which only some of the possible examples were shown. Other aspects can, however, be embodied in many different forms and should not be construed as limited to the examples set forth herein. Rather, these examples were provided so that this disclosure was thorough and complete and fully conveyed the scope of the possible examples to those skilled in the art.

Although specific examples were described herein, the scope of the technology is not limited to those specific examples. One skilled in the art will recognize other examples or improvements that are within the scope of the present technology. Therefore, the specific structure, acts, or media are disclosed only as illustrative examples. Examples according to the technology may also combine elements or components of those that are disclosed in general but not expressly exemplified in combination, unless otherwise stated herein. The scope of the technology is defined by the following claims and any equivalents therein.

What is claimed is:

1. A method of ejecting a sample from a nebulizer nozzle fluidically coupled to a port via a transfer conduit, the method comprising:

receiving at the port a transport liquid and the sample;

transporting the transport liquid and the sample in the transfer conduit from the port to a transfer conduit exit comprising an electrode tip;

ejecting the transport liquid from the transfer conduit exit;

ejecting the sample from the transfer conduit exit substantially simultaneously with ejecting the transport liquid; and during ejection of the transport liquid and the sample from the transfer conduit exit, generating a pressure at the transfer conduit exit substantially similar to a vapor pressure of the transport liquid by ejecting a nebulizer gas from a nebulizer nozzle proximate the electrode tip substantially simultaneously with ejecting the transport liquid and the sample, wherein the nebulizer gas is ejected at a drive pressure sufficient to induce flash boiling of the transport liquid.

2. The method of claim 1, wherein the transfer conduit exit projects from the nebulizer nozzle.

3. The method of claim 2, further comprising heating the nebulizer gas ejected from the nebulizer nozzle.

4. The method of claim 3, wherein heating the nebulizer gas comprises heating the nebulizer nozzle.

5. The method of claim 3, wherein heating the nebulizer gas comprises applying a thermal energy to a reservoir containing the nebulizer gas.

6. The method of claim 1, further comprising applying a thermal energy to the electrode tip.

7. The method of claim 1, further comprising heating the transport liquid.

8. The method of claim 1, wherein the electrode tip is disposed in a vacuum chamber and wherein the method further comprises applying a vacuum pressure to the vacuum chamber.

9. The method of claim 2, wherein the nebulizer gas comprises nitrogen.

10. A mass analysis instrument comprising:

a port for receiving a sample and a transport liquid;

a transfer conduit coupled to the port and having a transfer conduit end opposite the port;

an electrode tip coupled to the transfer conduit end;

a nebulizer nozzle disposed proximate the electrode tip;

a processor; and a memory storing instructions that are configured to, when executed by the processor, cause the mass analysis instrument to perform a set of operations comprising:

substantially simultaneously ejecting the sample and the transport liquid from the transfer conduit end; and performing a pressure-generating operation proximate the transfer conduit end, wherein the pressure-generating operation generates a pressure at the transfer conduit end substantially similar to a vapor pressure of the transport liquid by ejecting a nebulizer gas from the nebulizer nozzle substantially simultaneously with ejecting the transport liquid and the sample, wherein the nebulizer gas is ejected at a drive pressure sufficient to induce flash boiling of the transport liquid.

11. The mass analysis instrument of claim 10, further comprising a vacuum chamber, wherein the transfer conduit end is disposed within the vacuum chamber, wherein the pressure-generating operation further comprises applying a vacuum to the vacuum chamber.

12. The mass analysis instrument of claim 10, wherein the electrode tip projects from the nebulizer nozzle, and wherein the pressure-generating operation further comprises applying a thermal energy to at least one of the nebulizer nozzle and the transfer conduit.

13. The mass analysis instrument of claim 10, wherein the electrode tip projects from the nebulizer nozzle, and wherein the pressure-generating operation further comprises applying a thermal energy to the nebulizer gas.

14. The mass analysis instrument of claim 10, further comprising a vacuum chamber, wherein the nebulizer nozzle is disposed in the vacuum chamber.

15. The mass analysis instrument of claim 10, wherein the port comprises an open port interface (OPI).

16. The mass analysis instrument of claim 10, wherein the nebulizer nozzle comprises a diameter of greater than about 0.3 mm.

17. The mass analysis instrument of claim 10, wherein the transport liquid comprises at least one of methanol and acetonitrile.

18. A mass analysis instrument comprising:

a port for receiving a sample and a transport liquid;

a transfer conduit coupled to the port and having a transfer conduit end opposite the port;

an electrode tip coupled to the transfer conduit end;

a vacuum chamber, wherein the transfer conduit end is disposed within the vacuum chamber;

a processor; and a memory storing instructions that are configured to, when executed by the processor, cause the mass analysis instrument to perform a set of operations comprising:

substantially simultaneously ejecting the sample and the transport liquid from the transfer conduit end; and performing a pressure-generating operation proximate the transfer conduit end, wherein the pressure-generating operation generates a pressure at the transfer conduit end substantially similar to a vapor pressure of the transport liquid by applying a vacuum to the vacuum chamber at a vacuum pressure sufficient to induce flash boiling of the transport liquid.

19. The mass analysis instrument of claim 18, wherein the port comprises an open port interface (OPI).

20. The mass analysis instrument of claim 18, wherein the transport liquid comprises at least one of methanol and acetonitrile and nitrogen.

* * * * *